Patented July 11, 1939

2,165,813

UNITED STATES PATENT OFFICE 2,165,813

CHLORINATED DIPHENYL ETHERS AND METHOD OF MAKING SAME

Carl F. Prutton, Cleveland, Ohio, assignor to The Dow Chemical Company, Midland, Mich., a corporation of Michigan No Drawing. Application June 6, 1936, Serial No. 83,976

30 Claims. (Cl. 260—612)

This invention relates as indicated to halogenated diphenyl ethers and more specifically to compounds which, as herein defined, are halogenated diphenyl ethers; halogen-bearing diphenyl ethers; and mixtures of such compounds and more particularly, to the corresponding chlorine derivatives of diphenyl ether. Diphenyl ether is sometimes referred to as diphenyl oxide. This invention also relates to methods of manufacture of the above mentioned compositions, which methods are characterized by the fact that certain compounds previously known are, by the present invention, produced in a more efficient manner and other compounds new in themselves, not previously made, may be produced thereby.

The present application is a continuation-in-part of a co-pending application, Serial No. 737,070, filed July 26, 1934, in which the aforesaid halogenated diphenyl ether derivatives and products and methods of making same are disclosed.

Halogenated diphenyl ether has usually been prepared in the prior art by the halogenation of a solution of diphenyl ether i. e., diphenyl ether dissolved in an inert solvent such as carbon tetrachloride.

Halogenated diphenyl ether has also been made in the prior art by the reaction of two different compounds; for example, halogenated benzene with a salt of chlorophenol.

It is one of the principal objects of this invention, therefore, to provide halogenated or halogen-bearing diphenyl ether compounds not previously available and to provide an improved method of manufacture of such compounds generally.

Other objects of the invention will appear as the description proceeds.

To the accomplishment of the foregoing and related ends, said invention, then, consists of the means hereinafter fully described and particularly pointed out in the claims, the following description setting forth in detail certain approved combinations of ingredients embodying my invention, such disclosed means constituting, however, but certain of various forms in which the principle of the invention may be used.

I have been the first to prepare halogenated diphenyl ethers containing more than four and less than ten atoms of halogen per molecule; chlorinated diphenyl ethers containing more than three atoms of chlorine per molecule; liquid mixtures of halogenated diphenyl ethers containing combined halogen in amounts equivalent to an average of more than four atoms of halogen per molecule; and liquid mixtures of halogenated diphenyl ethers containing combined chlorine in amounts equivalent to an average of more than two atoms of chlorine per molecule.

I have also been the first to prepare compositions containing compounds in which at least some of the halogen or more specifically chlorine, instead of being substituted for hydrogen in the molecule is added to the molecule without displacing hydrogen, thus resulting in what may be best defined as a halogen addition product resulting from the halogenation of diphenyl ether.

The above referred to mixtures of halogenated diphenyl ethers are characterized by the fact that those containing amounts of halogen on the order of six or less atoms per molecule are, for the most part, liquids and usually viscous at ordinary temperatures; whereas, those containing an average of more than six atoms of halogen per molecule usually range from semi-solid resins to crystalline solids. Such mixtures, as above defined, may be mixtures of compounds having different numbers of halogen or more specifically, chlorine atoms per molecule and/or mixtures containing compounds having the halogen or chlorine atoms attached to the ring structures in different positions, i. e., isomeric compounds. Such mixtures may also include mixtures of addition and substitution products as hereinbefore defined. The manner in which such compounds and mixtures may be manufactured will be treated more specifically hereinafter under the description of the process comprised by my invention.

The new polychlorinated diphenyl ether products containing the equivalent of more than two atoms of chlorine per molecule are mixtures of isomeric compounds and other closely related compounds which may vary somewhat in chlorine content. At room temperature, the mixtures vary in physical characteristics from viscous oily liquids to solid non-crystalline resins to crystalline solids as the chlorine content thereof is increased. Although individual compounds may, in some instances, be separated from such mixtures, the mixtures themselves possess characteristics which render them valuable as ingredients in lubricants, resins, electrical equipment, dielectrics, impregnating compounds, etc., as hereinafter mentioned. The mixtures containing more than three chlorine atoms per molecule are especially suitable for such purposes.

The relationship between the chlorine content of, and average number of chlorine atoms in my chlorinated diphenyl ether products is illustrated by the following table:—

TABLE I

| Formula | Percent Cl by weight |
|---|---|
| $C_{12}H_7OCl_3$ | 39 |
| $C_{12}H_6OCl_4$ | 46.2 |
| $C_{12}H_5OCl_5$ | 51.8 |
| $C_{12}H_4OCl_6$ | 56.5 |
| $C_{12}H_3OCl_7$ | 60.5 |
| $C_{12}H_2OCl_8$ | 63.7 |
| $C_{12}HOCl_9$ | 66.4 |
| $C_{12}OCl_{10}$ | 69 |

It is to be understood, of course, that such products as are mixtures of compounds, need not contain chlorine in a proportion corresponding exactly to that of any individual chlorinated diphenyl ether compound, but may contain any proportion of chlorine between 39 and 69 per cent by weight, corresponding to the equivalent of more than three to nearly ten atoms of chlorine per molecule. It should be noted that a composition containing the equivalent of ten atoms of chlorine per molecule, instead of being a mixture of compounds containing different amounts of chlorine per molecule, will consist substantially of the individual compounds decachlor diphenyl ether.

Methods of manufacture

I have discovered that diphenyl ether may be directly halogenated or more specifically chlorinated with or without the use of various catalysts such as the so-called "chlorine carriers", e. g., iodine, iron, metal halides such as the chlorides of iron, aluminum, antimony, bismuth, tin, zinc, etc. and phosphorus tri-chloride to form a series of halogen-bearing products, or more specifically chlorine-bearing products containing up to and including ten atoms of halogen per molecule. By "direct halogenation" is meant the process of introducing the halogen by progressive amounts into the diphenyl ether (or partially halogenated diphenyl ether) in the substantial absence of a solvent until the desired degree of halogenation is attained.

Referring now more particularly to the chlorine derivatives of diphenyl ether, it will be noted that prior to my invention, very little was known concerning such derivatives. Diphenyl ether had been chlorinated, in the presence of carbon tetrachloride as a solvent, to produce monochloro- and dichloro-diphenyl ether, but no higher chlorination products were obtained. A trichloro-diphenyl ether had also been prepared by diazotizing a monoamino-dichloro-diphenyl ether and reacting the resultant diazonium salt with cuprous chloride in accordance with the well known Sandmeyer reaction. Insofar as I am aware, no polychlorinated diphenyl ether containing more than three chlorine atoms per molecule had been prepared.

I have now found that polychlorinated diphenyl ethers containing more than three atoms of chlorine per molecule, i. e., above 39 per cent of chlorine by weight, may readily be prepared by passing chlorine into diphenyl ether at a temperature sufficiently elevated to maintain the reaction mixture in a mobile fluid condition. I have further found that the character of the chlorinated product is dependent not only on the extent of chlorination but upon other conditions as well; such as the temperature at which the chlorination is carried out, whether or not a chlorine carrier is used, the concentration of chlorine in the gas used for chlorination, and the nature of the atmosphere in which the reaction takes place.

When chlorine gas is passed into liquid diphenyl ether (melting point about 27° C.) heat is generated and the temperature may be controlled either by controlling the rate of chlorination or by other means such as cooling or heating coils, jacketed vessels, etc. The rate of heat evolution decreases as the chlorination progresses and as the percentage of chlorine in the produce increases beyond approximately 40% chlorine in the product, depending on the volume of the reaction mass, amount of radiation, etc., it may be necessary to supply heat in order to maintain the desired temperature.

The type of product desired controls the use and type of catalyst, the temperature, and other conditions under which the chlorination is performed. There are, as previously indicated, two general types of reaction products: First, the substitution type or, as previously stated, halogenated diphenyl ethers in which the chlorine atom replaces hydrogen of the original diphenyl ether molecule; and second, the halogen-bearing or addition type in which at least some of the halogen or chlorine adds on to the molecule without displacement of hydrogen. Some of these addition products may be identical with certain chlor-hydro-diphenyl ethers.

The addition type may be converted into the substitution type, with loss of hydrogen chloride by heating to a sufficiently high temperature, especially in the presence of chlorine carriers and alkaline materials such as the hydroxides, carbonates, bi-carbonates of sodium, potassium, the alkaline earth metals, etc.

To carry out the chlorination so as to produce a material which consists almost entirely of substitution products, it is best to employ a chlorine carrier of the class including iron, iron chloride and aluminum chloride and to maintain the temperature at about 145° C. or higher. A product containing up to about 50% chlorine may be easily prepared in this way. However, by elevating the temperature and preferably by use of an appropriately active catalyst such as aluminum chloride, the chlorine content may be increased up to an amount equivalent to 8 atoms of chlorine per molecule and finally up to the maximum theoretically possible. These products are complex mixtures of chlorine substitution products ranging from the monochlor- up to and including nona- or deca-chlor diphenyl ethers.

Any product thus prepared may be further refined by treating (optionally at elevated temperatures) with solutions of alkalies, or solid alkalies, alkaline earth oxides, carbonates, etc., to remove free acid and decompose such small amounts of addition products as may be present.

Chlorinated diphenyl ethers prepared as described above, may be further refined by vacuum distillation. Liquids refined from the lowest boiling fractions are relatively fluid and may have very low freezing points. Higher boiling fractions are increasingly viscous until extremely stable waxy or crystalline solids result from the highest boiling fractions. It is possible also to crystallize out certain pure solid constituents such as tetrachlor-diphenyl ether, hexachlor diphenyl ether and others, by chilling and filtering.

Where it is desired to obtain a maximum amount of addition products when diphenyl ether is chlorinated directly, the formation of such products is favored by:

(1) a low reaction temperature (e. g. 100° C. or lower).

(2) absence of "chlorine carriers".

(3) maintenance of a high concentration of hydrogen chloride in the atmosphere in which the reaction is carried out. This condition may be obtained by chlorination by a counterflow process, i. e., where the flow of liquid is in a direction counter to that of the gas flow in a single container; or where, in a multiple-container apparatus, the liquid is advanced toward the source of chlorine.

(4) high concentration of chlorine.

In chlorinating diphenyl ether under the conditions just specified, chlorine substitution, as well as chlorine addition products are obtained.

When chlorinated diphenyl ether is prepared so as to contain a substantial proportion of addition products (e. g. a mixture containing about 45% chlorine with about one-fourth of the chlorine in the form of addition products), it is desirable to remove the less stable material by treatment with an alkali. This is conveniently done by heating to a temperature near the maximum temperature to be encountered by the material when in use, with a solid alkaline material such as crushed quick-lime or the hydroxides or carbonates of sodium or potassium, either in the anhydrous state or in the presence of a small proportion of water.

For most purposes, the diphenyl ether employed in preparing the aforesaid polychlorinated diphenyl ether products need not be pure, but may be of technical grade and contain a small proportion of the usual impurities incident to its manufacture.

*Types of apparatus which may be used in the foregoing process*

The simplest type of apparatus which may be used for chlorination is a single reactor which may be of iron except when it is desired to produce a maximum amount of addition products. This single reactor may be fitted with internal cooling or heating coils or with a jacket for the same purpose and the operation may be carried out in batch fashion by charging the reactor with diphenyl ether and maintaining the temperature above its melting point while passing chlorine into the reactor at a point near the bottom. The hydrogen chloride generated by the reaction may be conducted off from the top of the reactor and the temperature controlled as desired by passing a cooling or heating fluid, e. g. water or steam, through the coils or jacket, or by varying the rate of chlorination.

For more efficient use of the chlorine gas, or to promote the formation of addition products, it may be preferable to have a series of such reactors in which the gas from the top of one reactor is conducted into the bottom of the next. In this case it is best to advance the liquid from one reactor to the next towards the source of chlorine gas.

Another and still more efficient method is to pump the liquid diphenyl ether or mixture of chlorination products into the top of a reaction tower preferably filled with a distributing solid such as small sections of iron pipe. Chlorine gas is conducted into the bottom of the tower and the exhaust gases including hydrogen chloride, generated by the reaction and any unreacted chlorine, is drawn off at the top. It may be preferable to use several of such towers connected in series and operated in counter-flow fashion. The temperature control required for the operation of such towers may be obtained by passing the liquid through a coil which may be heated or cooled as required before conducting it into the top of the tower.

Examples of the products resulting from the process utilizing two different types of apparatus as described above are as follows:—

Example I

*Apparatus*

Three iron tanks, in series, with gas-input tubes extending to near bottom of each tank.

*Temperature*

Average temperature between 100 and 120° C.

*Operation*

Series of tanks operated in counterflow fashion, i. e., fresh diphenyl ether placed in tank from which exhaust gas finally withdrawn, (tank #3) and material undergoing final chlorination in tank in which chlorine is introduced (tank #1). Exhaust gas from tank #1 goes to tank #2, and exhaust gas from tank #2 to tank #3.

*Samples*

Withdrawn from tank indicated, at time indicated. Result of tests and analyses shown in following table:

| Sample No. | From tank #— | Hours of chlorination | Specific gravity at 88° F. | Viscosity (Saybolt) at 100° F. | Total chlorine | Chlorine in form of addition products |
|---|---|---|---|---|---|---|
| | | | | Seconds | Percent | |
| 1 | 2 | 5 | 1.094 | 36 | 3.5 | 0.7 |
| 2 | 2 | 8½ | 1.122 | 38 | 10.1 | 1.0 |
| 3 | 2 | 12½ | 1.206 | 45 | 14.2 | 4.5 |
| 4 | 3 | 18 | 1.310 | 150 | 23.0 | 6.8 |
| 5 | 3 | 25 | 1.384 | 307 | 31.3 | 10.0 |
| 6 | 3 | 32 | 1.424 | 1,070 | 41.5 | 13.0 |
| 7 | *3 | 38 | 1.442 | 1,090 | 37.7 | 10.7 |

*After blowing with air at approx. 100° C.

Example II

*Apparatus*

Iron tower, filled with short sections of iron pipe.

*Temperature*

Approximately 90° C. at top of tower.

*Operation*

(1) Liquid drawn from bottom of tower by pump, and recirculated by returning to top of tower.

(2) Chlorine introduced at bottom of tower, and exhaust gas (principally hydrogen chloride) withdrawn at top.

*Examples*

Withdrawn from system at time after start of operation, indicated in table. Results of tests and analyses shown in following table:

| Sample No. | Hours of chlorination | Specific gravity | Viscosity (Saybolt) at 100° F. | Total chlorine | Chlorine in form of addition products |
|---|---|---|---|---|---|
| | | | Seconds | Percent | Percent |
| 1 | 1 | 1.202 | 46 | 16.2 | 5.7 |
| 2 | 2 | 1.254 | 66 | 22.5 | 10.3 |
| 3 | 3½ | 1.322 | 138 | 29.5 | 11.8 |
| 4 | 4 | 1.344 | 245 | 32.5 | 13.0 |
| 5 | 5 | 1.386 | 755 | 35.5 | 14.3 |
| 6 | 6 | 1.412 | 2,940 | 37.5 | 17.7 |

EXAMPLE III

Gaseous chlorine was bubbled through 605 grams of diphenyl oxide, contained in a glass reaction vessel, for 30 hours, at the end of which time the liquid reaction mixture weighed 1378 grams, the increase in weight corresponding to a chlorine content of approximately 6 chlorine atoms per molecule of the chlorinated diphenyl ether. The reaction mixture so obtained was a viscous liquid at room temperature. The mixture was then heated in glass apparatus to 180° C. Gaseous material, probably hydrogen chloride, was evolved with resultant loss in weight of the product. One gram of aluminum chloride was then added to the mixture; the latter was heated to and maintained at approximately 140° C. and additional chlorine was passed into the same for a period of 23 hours, at the end of which time the increase in weight of the mixture indicated the same to have a chlorine content corresponding to approximately 8 chlorine atoms per molecule. The product so obtained was a dark-red viscous mass which was very soluble in carbon tetrachloride and ethyl ether, fairly soluble in ethyl alcohol but insoluble in water.

EXAMPLE IV

A mixture of 459 grams of diphenyl ether and one gram of aluminum chloride was treated with chlorine as in the preceding example, the temperature of the mixture being raised gradually from 30° C. to approximately 160° C. during the initial period of chlorination and maintained at temperatures between 160° C. and 180° C. during the remainder of the chlorination. During the treatment with chlorine a total of 1.9 grams of additional aluminum chloride was added in portions to the mixture.

The chlorination was continued until the mass became nearly solid. At the close of the chlorination, the reacted mixture weighed 1274 grams, the increase in weight corresponding to a chlorine content of approximately 9 chlorine atoms per molecule of chlorinated diphenyl ether. The product was, at room temperature, a dark solid resembling pitch in texture. It was heated in a current of air whereby a crystalline material melting at approximately 313° C. was separated in the form of needles by sublimation.

I have also prepared a viscous liquid composition, having a chlorine content corresponding approximately to that of tetrachloro-diphenyl ether, by reacting chlorine with diphenyl ether at temperatures in the neighborhood of 80–120° C.

Uses of the compositions

Liquid compositions of matter containing three or more atoms of halogen per molecule are particularly useful as di-electric fluids in the electrical uses and as lubricants or lubricant addition agents for lubricating uses. For the electrical uses, it is important that the composition be freed of the addition type of reaction product but in the case of the lubricating use, it may be advantageous to have such addition products present. For the electrical use high stability, low volatility and non-inflammability are characteristics possessed by these compositions which are especially desired.

Likewise for lubricating uses, high stability, low volatility and non-inflammability are desirable characteristics and in addition, such compositions may be made to possess high viscosity and high load-carrying characteristics.

Of the solid compositions here described, many possess a wax-like character making them particularly useful as solid di-electric materials and also as inert plastic materials for many uses. These solids are also available for many uses including that of improving the properties of other liquids useful in the electric and lubricating fields because of their high degree of solubility in most organic liquids.

Certain of the liquid and solid compositions are useful as impregnating compounds for the preservation of wood and similar materials, and for water-proofing materials such as strawboard.

Other modes of applying the principle of my invention may be employed instead of the one explained, change being made as regards the materials employed in carrying out the process, provided the ingredient or ingredients stated in any of the following claims or the equivalent of such stated ingredient or ingredients be employed.

I, therefore, particularly point out and distinctly claim as my invention:

1. As a composition of matter, chlorinated diphenyl ethers having a combined chlorine content corresponding to an average of more than three atoms of chlorine per molecule.

2. Chlorinated diphenyl ether containing more than three atoms of combined chlorine per molecule.

3. Chlorinated diphenyl ether containing more than three and not more than eight atoms of combined chlorine per molecule.

4. Chlorinated diphenyl ether containing from four to ten atoms of combined chlorine per molecule.

5. As a composition of matter, a mixture of chlorinated diphenyl ethers containing an amount of combined chlorine equivalent to an average of more than two atoms of chlorine per molecule.

6. As a composition of matter, a mixture of chlorinated diphenyl ethers consisting largely of chlorinated diphenyl ethers having at least three atoms of combined chlorine per molecule.

7. As a composition of matter, a mixture of chlorinated diphenyl ethers containing an amount of combined chlorine equivalent to an average of at least three and not more than eight atoms of combined chlorine per molecule.

8. As a composition of matter, chlorinated diphenyl ethers containing from 39% to 69% chlorine by weight.

9. As a composition of matter, a mixture of chlorine-bearing diphenyl ethers containing from 39% to 69% chlorine by weight.

10. As a composition of matter, a molecularly heterogeneous mixture of chlorinated diphenyl ethers containing an average of more than two atoms of chlorine per molecule with the chlorine of different constituent compounds connected to the ring structure in different positions.

11. As a composition of matter, a molecularly heterogeneous mixture of chlorinated diphenyl ethers containing an average of more than two atoms of chlorine per molecule with the molecules of different constituent compounds containing a different number of chlorine atoms.

12. As a composition of matter, a molecularly heterogeneous mixture of chlorinated diphenyl ethers containing an average of more than two atoms of chlorine per molecule and including a plurality of compounds respectively having the chlorine attached to the ring structure in different positions and containing a different number of chlorine atoms per molecule.

13. As a composition of matter, a mixture of chlorinated diphenyl ethers containing an average of more than two atoms of chlorine per molecule and including chlorine addition products.

14. The method of making chlorinated diphenyl ether which comprises passing chlorine through liquid diphenyl ether in the absence of a solvent.

15. The method of making chlorinated diphenyl ether which comprises passing chlorine through liquid diphenyl ether in the presence of a catalyst and in the absence of a solvent.

16. The method of making chlorinated diphenyl ether which comprises passing chlorine through liquid diphenyl ether in the presence of a catalyst of the halogen-carrier type and in the absence of a solvent.

17. The method of making chlorinated diphenyl ethers which comprises passing chlorine through liquid diphenyl ether in the presence of a catalyst of the halogen-carrier type and in the absence of a solvent and then refining such product by treating the same with an alkali.

18. A chlorinated diphenyl ether composition preparable by reacting chlorine with diphenyl ether at temperatures of 145° C. and above, and having a combined chlorine content corresponding to an average of more than two atoms of chlorine per molecule.

19. Chlorinated diphenyl ether, preparable by reacting chlorine with diphenyl ether at a temperature above 145° C., and containing combined chlorine in a proportion representing more than three chlorine atoms per molecule.

20. The method which comprises reacting chlorine with diphenyl ether at a temperature of at least 145° C. to form a chlorinated diphenyl ether mixture having a chlorine content corresponding to more than two chlorine atoms per molecule.

21. The method which comprises reacting chlorine with a compound selected from the class consisting of diphenyl oxide and lower chlorinated diphenyl oxides, at a temperature above about 145° C. and in the presence of a halogenation catalyst, to form a chlorinated diphenyl oxide mixture having a chlorine content corresponding to more than four and less than ten atoms of combined chlorine per mol of chlorinated diphenyl oxide.

22. A chlorinated diphenyl oxide composition, preparable by reacting chlorine with diphenyl oxide at an elevated temperature sufficient to maintain the reaction mixture in a mobile fluid condition, and having a chlorine content corresponding approximately to that of hexachlorodiphenyl oxide.

23. Chlorinated diphenyl oxide, preparable by reacting chlorine with diphenyl oxide at an elevated temperature sufficient to maintain the reaction mixture in a mobile fluid condition, and having a chlorine content corresponding to more than 4 and less than 10 atoms of combined chlorine per mol of chlorinated diphenyl oxide.

24. The method which comprises reacting diphenyl oxide with chlorine at an elevated temperature sufficient to maintain the reaction mixture in a mobile fluid condition to form a chlorinated diphenyl oxide mixture having a chlorine content corresponding to more than four and less than ten atoms of combined chlorine per mol of chlorinated diphenyl oxide.

25. The method which comprises reacting diphenyl oxide with chlorine at an elevated temperature sufficient to maintain the reaction mixture in a mobile fluid condition, and heating the reaction mixture to a temperature sufficient substantially to decompose chlorine addition products, to form a chlorinated diphenyl oxide mixture having a chlorine content corresponding to more than four and less than ten atoms of combined chlorine per mol of chlorinated diphenyl oxide.

26. The method which comprises reacting diphenyl oxide with chlorine, in the presence of a chlorination catalyst and at an elevated temperature sufficient to maintain the reaction mixture in a mobile fluid condition and substantially to prevent formation of chlorine addition compounds to form a chlorinated diphenyl oxide mixture having a chlorine content corresponding to more than four and less than ten atoms of combined chlorine per mol of chlorinated diphenyl oxide.

27. The method which comprises reacting diphenyl oxide with sufficient chlorine at an elevated temperature sufficient to maintain the reaction mixture in the mobile fluid condition to form a chlorinated diphenyl oxide mixture having a chlorine content corresponding to more than four and less than ten atoms of substituted chlorine per mol of chlorinated diphenyl oxide, heating the reaction mixture to a temperature sufficient substantially to decompose chlorine addition products, removing hydrogen chloride from the reacted mixture, and distilling the latter.

28. The method which comprises reacting chlorine with diphenyl oxide at a temperature above about 145° C., and in the presence of a chlorination catalyst, to form a chlorinated diphenyl oxide mixture having a chlorine content corresponding to more than four and less than ten atoms of combined chlorine per mol of chlorinated diphenyl oxide.

29. A liquid chlorinated diphenyloxide composition having a chlorine content of approximately 40 to 51 per cent.

30. A chlorinated diphenyloxide composition, preparable by reacting chlorine with diphenyloxide at an elevated temperature sufficient to maintain the reaction mixture in a mobile fluid condition, and having a chlorine content corresponding approximately to that of heptachlorodiphenyloxide.

CARL F. PRUTTON.